United States Patent Office 3,214,649
Patented Oct. 26, 1965

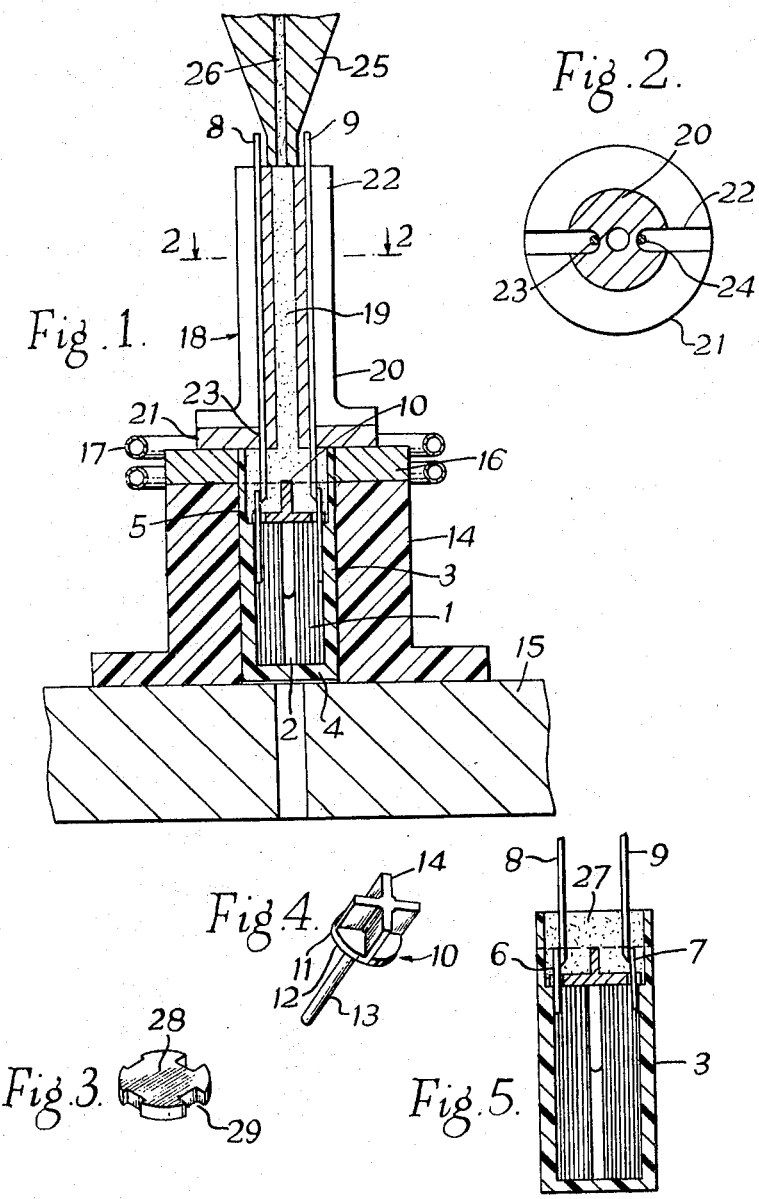

3,214,649
SEALED ELECTROLYTIC CAPACITOR AND
METHOD OF MAKING SAME
Arthur H. Clargo, Swindon, and Michael O. Pearce, Beckenham, England, assignors to The Plessey Company Limited, London, England, a British company
Filed Oct. 3, 1961, Ser. No. 142,739
Claims priority, application Great Britain, Oct. 5, 1960, 34,187/60
4 Claims. (Cl. 317—230)

This invention relates to electrolytic capacitors which are arranged in a sealed case through which the electrode leads of the capacitor element extend, and it has for an object to provide improved capacitors of this kind and a method of producing them.

According to an aspect of the invention the capacitor element is inserted into a sleeve-like case of insulating material which may be closed at one end, with the capacitor leads extending through at least one end of the sleeve, the sleeve being formed with an internal shoulder spaced at a distance from its open end or ends sufficient to permit the sealing and encapsulation of the joints as described herein below; then a cover traversed by a passage for each lead through which the lead can pass, is placed on to the shoulder, with each capacitor lead passing through one such aperture; and finally the end of the sleeve is sealed by introducing thermo-plastic material by injection moulding into the open end of the sleeve, at the outer side of the cover, so as to form a plug which forms an air-tight seal not only with the wall of the sleeve but also round each electrode lead extending from the capacitor through the previously open end of the sleeve. If it is desired to provide leads at one end of the capacitor only, a sleeve with a closed end will normally be used. Leads can be provided at both ends however either, for example by piercing the base of such a sleeve and rivetting connections in the usual manner, or by carrying out the injection moulding operation at both ends of the tube. This operation may be carried out on both ends simultaneously but it is generally preferred to mould one end at a time, a small spacing plug of an inert material, for example aluminium, stainless steel, or epoxy resin, being placed at the end of the tube which is not being closed to maintain the cartridge in correct position when the first end is being sealed.

In a preferred form of the invention the sleeve consists likewise of thermo-plastic material identical or compatible with the material of the plug, and external heat may be applied to assist fusion of the plug with the material of the sleeve. The moulding is carried out in a jig which comprises a die member accommodating the sleeve and a detachable cover member having apertures for the passage of the terminal wires and containing a passage for the introduction of the injection moulding material.

The cover which is placed on the shoulder of the sleeve, conveniently consists of the same material as the sleeve and/or the plug, and while it may be simply a flat plate having suitable cut-outs or apertures for the passage of the connections, it has been found advantageous to provide the cover at its inner side with a central locating pin entering an axial hole in the capacitor element, for example the central hole of a wound foil type capacitor, and at its outer side with a pair of crossed guide ribs or fins for co-operation with the inner surface of the sleeve wall above the shoulder.

The invention is illustrated by way of example in the accompanying drawing.

FIGURE 1 is an axial section showing an injection-moulding device according to the present invention with a sleeve open at one end and a capacitor element and cover placed therein, during the injection moulding of the sealing plug.

FIGURE 2 is a cross-section of the cover portion of the mould in section in line 2—2 of FIGURE 1.

FIGURE 3 is a perspective view of a flat cover plate and,

FIGURE 4 is a similar perspective view of a modified cover plate.

FIGURE 5 is an axial section of a complete sealed capacitor,

Figure 7:
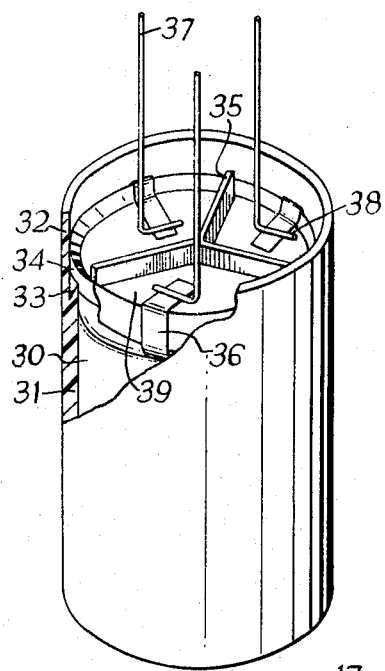

Referring now first to FIGURE 1, a capacitor element 1, for example a wound aluminium-foil electrolytic capacitor element having a central passage 2, is placed into a case made of polypropylene and comprising a sleeve 3 closed by a bottom 4 but open at the opposite end. An internal shoulder 5, spaced from the bottom by the length of the element 1, is formed by reducing the wall thickness above the shoulder 5.

The capacitor element 1 has a cathode tab 6 and an anode tab 7 (see also FIGURE 5) to which terminal leads 8 and 9 of tinned copper wire are connected by spot welding. After the element with the requisite quantity of electrolyte has been placed on the bottom of the case 3, a cover or separator 10 is introduced, which is shown individually in FIGURE 4. It comprises a separator disc proper 11 of basically circular shape, in which recesses for the passages of electrode are formed at approprate places by flattening portions 12 of its circumference. The disc 11 is provided with an axially projecting centering pin 13, which enters the central passage 2 of the capacitor element 1, centering the same in the case 3, while at its opposite side it is provided with a pair of crossed ribs 14 which have the dual purpose of separating the tabs 6, 7 and centering and guiding the disc 11 in the bore of the case 3 above the shoulder and preventing it from tilting. The separator 10, which preferably consists of the same material as the case 3, serves to limit the penetration of the extruded plastic material which is ultimately used to seal the open end of the case. In order to effect this sealing, the case with the capacitor element and separator is placed into an injection mould body 14 of insulating material, for example of asbestos-fibre reinforced synthetic resin material, which has a bore accommodating the body of the case 3, and which is secured in any suitable manner to a metal base plate 15, in which the bottom of the case 3 rests. The bore of the body 14 is continued in a steel plate 16, which accommodates the open end portion of the case 3 and which terminates substantially flush therewith. This steel plate is adapted to be heated by an induction coil 17 of tubular conductor material when a radio frequency source is applied to the coil. The mould is completed by a top member 18, for example of brass, which essentially contains a straight conduction passage 19 in a stem 20 formed with an end flange 21, the stem 20 and the upper portion of the flange 21 are provided with longitudinal grooves 22 of sufficient depth to accommodate the electrode lead wires 8 and 9, and the lower portion of the flange 21, into which the grooves 22 do not extend, is perforated by two bores 23, 24 extending along the line of the wires 8 and 9, so as to allow the top member 18 to be placed on the steel plate 16 after threading the wires 8 and 9 through the bores 23 and 24 respectively. When the mould has been thus assembled, the nozzle 25 of the injection moulder is applied to the upper end of top member 18 with its moulding passage 26 in alignment with the passage 19 and polypropylene is injected into the mould cavity, while at the same time the steel plate 16 is heated by energisation of the coil 17. When the mould cavity as been filled and sufficient fusion achieved between the injected material and the wall of the casing 2 the heating current is switched off to allow the injected material to consolidate and the injection nozzle is removed, whereafter the top portion 18 of the mould can be removed upwardly, leaving the case sealed by an integral plug 27 of polypropylene. It will be appreciated that when this has been achieved, the spot-welded junctions between tabs 6 and 7 and lead wires 8 and 9 are closely embedded in the material of the plug 27, thereby protecting the welded junction from mechanical stress when the wires 8 and 9 are moved sideways. The joint is also protected from electrolytic corrosion.

Figure 6:
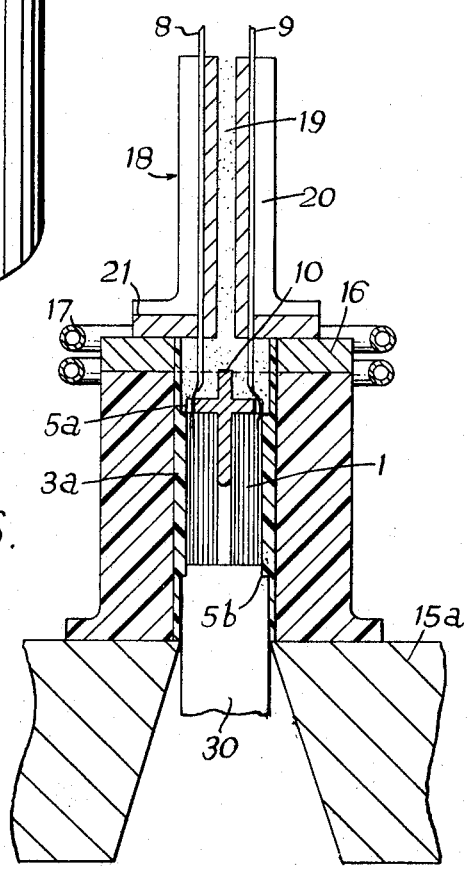
FIGURE 6 is a sectional elevation similar to FIGURE 1 showing the use of a sleeve open at both ends, and FIGURE 7 of the accompanying drawing is a perspective view of a preferred form of capacitor embodying the invention, with some parts broken away to disclose interior features.

FIGURE 6, in which the same references as in FIGURE 1 are used for corresponding features, shows the use of a temporary plug 30 of aluminium, stainless steel, epoxy resin, or other chemically inert material to close one end of a capacitor container sleeve 3a while the sleeve is provided at its other end with an injection-moulded plug according to the present invention.

While the use of a separator member 10 of the form illustrated in FIGURE 4 is generally preferred for reasons which will be apparent from the above description, the separator 10 may be replaced, if desired by flat separator discs 28 as shown in FIGURE 3. The passages for the tabs may, as shown in FIGURE 3, be provided by grooves 29 instead of the flats 12 shown in the embodiment of FIGURE 4. It will be appreciated that details of the embodiments described and illustrated may be modified without exceeding the scope of the invention. Thus, for example, one of the terminals may be provided in the bottom of the case 3 by a rivetted connection of the usual kind. On the other hand more than two connections may be arranged to pass through the injection-moulded plug 7; for example, in the case of a capacitor having two anodes and one cathode, the three terminals may all extend through the plug, and the number of flats 12 or grooves 29 may be accordingly varied, while at the same time varying the head 18 to provide the requisite bores and grooves for each lead provided.

Further, instead of forming the separator 10 with a pair of crossed ribs 14 as illustrated, the number of radial ribs may be varied, for example by providing three ribs extending at an angle of 120° to each other. Whole polypropylene has been found highly suitable in many cases, other thermo-plastic material may be used, and the arrangement is also applicable for capacitors other than electrolytic where an efficient seal is required, for example in the case of impregnated-paper or plastic-film capacitors.

FIGURE 7 is a perspective view of a convenient form of capacitor incorporating the invention. A wound capacitor cartridge 30 is accommodated in a cup-shaped plastic case 31, for example of polypropylene, having a reduced-thickness wall portion 32 near its open end. This portion joins the main body of the casing with an undercut shoulder 33. In order to render this shoulder and other internal features of the assembly visible, part of the casing 31 has been shown as broken away in the drawing. A cover disc 34, which substantially fits inside the wall 32, rests on the undercut shoulder 33 and has a lower face portion which is undercut to interlock with the shoulder 33. The cover further has radial webs 35 which sub-divide the outer face of the cover disc into three compartments, each of which receives the bent-over end of an aluminium-foil tab 36 from the cartridge 30, and three terminal wires 37 have each one end 38 bent over in L-shape and joined by pressure welding or the like to the associated foil tab 36, while the main portion of the terminal wire 37 extends parallel to the axis of the cup-shaped case 31. The part of the case 31 which is situated at the outer side of the cover disc 34, is filled by injection moulding with the same thermoplastic material which constitutes the case and the cover disc, this material filling the case above the cover inside the wall portion 32 to terminate level with the outer end thereof in the form of a plug 39 which, in order to allow the interior construction of the capacitor to be shown, is shown as transparent. This injection-moulded plug not only establishes a perfect seal with the container wall portion 32 and round the lead wires 37 but also encases the lead wires so as to hold them firmly in position and prevent mechanical strain on the welded connection between their bent-over portions 38 and the tabs 36.

What we claim is:

1. A method of sealing an electrolytic capacitor assembly including an open-ended case of electrically insulating thermoplastic material formed with an internal shoulder that faces the open end, a cover of insulating material placed on said shoulder to close said open end, said cover terminating short of said open end and having mutually at least one through bore, a capacitor element in said case, and a lead extending from said capacitor element through said through bore, the method comprising: placing the assembly into an injection mould, injecting thermoplastic material, fusible to that of the case, into the open end of the case to form a plug body substantially filling the open end of the case, applying localised heat externally to the case between the cover and said open end, and allowing said body to become fused to the case before removing the capacitor and assembly from the injection mould.

2. A method as claimed in claim 1, for use with an assembly in which the cover is of thermoplastic material fusible with the injected material, the method including the step of applying localised heat externally to the case between the shoulder and the open end of the case, and allowing the assembly to cool when the injected material has become fused to the casing and to the surface of the cover while the cover has still sufficient strength to retain the injected material.

3. An electrolytic capacitor, comprising a substantially cylindrical case of electrically insulating thermoplastic material closed at one end and formed with an internal shoulder facing and spaced from the other end, a cover of insulating material placed on said shoulder to close the case, said cover terminating short of said other end and having at least one through bore, an electrolytic capacitor element in said case between the cover and said closed end, said capacitor element having at least one terminal lead which extends through said bore of the cover, and a plug of thermoplastic insulating material fusible to the material of the case, said plug sealing the other end of the case in sealing contact with said leads and being integral with the case along a continuous area encircling the case between said shoulder and said other end of the case.

4. An electrolytic capacitor as claimed in claim 3, wherein the cover consists of thermoplastic material fusible with the material of the plug and is integrally joined with the plug.

References Cited by the Examiner
UNITED STATES PATENTS

| | | | |
|---|---|---|---|
| 2,464,022 | 3/49 | Carpenter | 317—230 |
| 2,758,259 | 8/56 | Peck | 317—230 |
| 2,900,579 | 8/59 | Rogers | 317—230 |

JOHN W. HUCKERT, *Primary Examiner.*

JAMES D. KALLAM, *Examiner.*